June 2, 1959  K. E. LUNDE  2,889,007
GREASE EXTRACTING VENTILATOR FOR KITCHEN RANGES
Filed Dec. 27, 1955
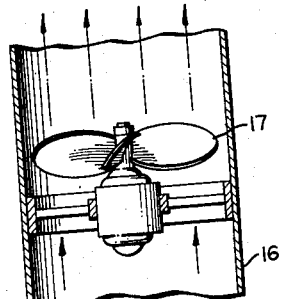
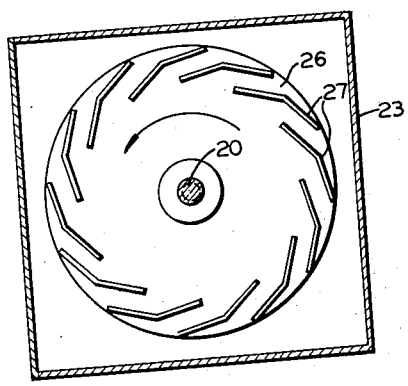
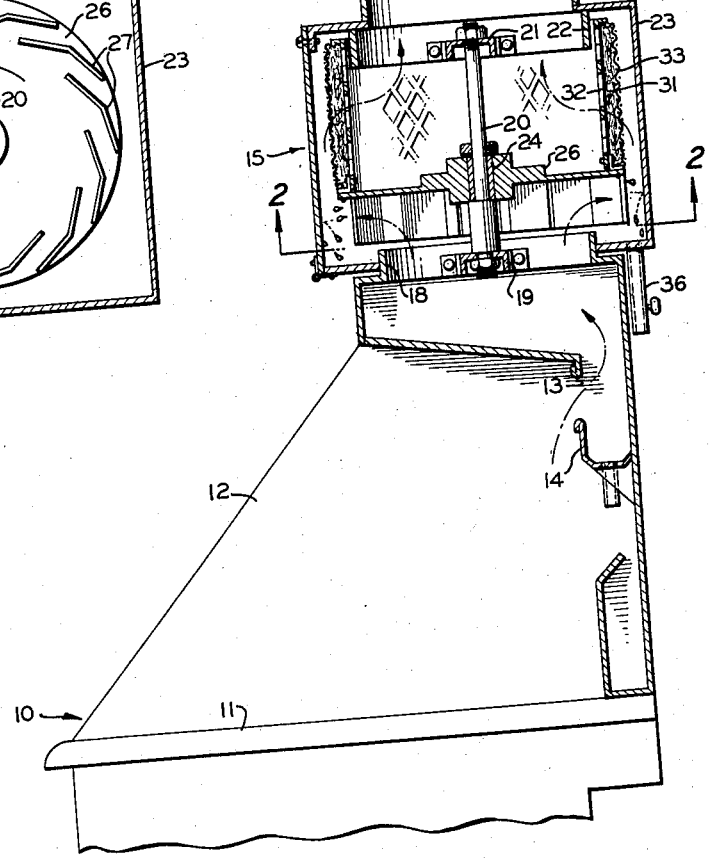
INVENTOR.
KENNETH E. LUNDE
BY
ATTORNEY

United States Patent Office 2,889,007
Patented June 2, 1959

2,889,007
GREASE EXTRACTING VENTILATOR FOR KITCHEN RANGES

Kenneth E. Lunde, Sunnyvale, Calif., assignor to Dohrmann Hotel Supply Co., San Francisco, Calif., a corporation of Nevada Application December 27, 1955, Serial No. 555,620

2 Claims. (Cl. 183—37)

The present invention is concerned with kitchen ventilators and with the extraction of grease from gases which are withdrawn from the cooking area, such as the range surface or fry surface in a commercial kitchen and relates more particularly to methods and apparatus for efficiently extracting the grease from such gases.

In the cooking of foods in commercial eating establishments, particularly in establishments such as "drive-ins" where the frying of quantities of grease-containing foods occurs, the problem of extracting grease from the gases over the cooking surface is quite severe.

In accordance with the instant invention, a process and apparatus for the extraction of the grease from the exhaust gases from the kitchen ranges is carried out in a novel and effective manner, in a series of steps, and accordingly it is a general object of the invention to provide an improved method and apparatus for the extraction of grease from the exhaust gases from above a cooking surface such as a range.

Another object of the invention is to provide improved apparatus of a simple structure which is in part self cleaning with respect to the grease collected.

The above and other objects of the invention are attained as described in connection with the preferred embodiment thereof, as illustrated in the accompanying drawing, in which:

Figure 1 is a vertical sectional view through a grease extracting unit embodying the invention, with a portion of a cooking range shown schematically.

Figure 2 is a sectional view taken in a plane indicated by the line 2—2 of Figure 1 and showing the rotor in bottom plan.

Referring to the drawing a conventional form of commercial kitchen range 10 is illustrated, having a cooking surface 11, and having respective side plates 12 at each side of the cooking surface, only one of which is seen. Grease laden gases from the surface of the range are extracted through a slot 13 above the grease collecting trough 14 and are drawn through the grease extracting unit 15 and a discharge conduit or duct 16 through which the gases are drawn by a conventional fan or blower 17. In general the duct 16 is cylindrical and leads to a suitable point of discharge for the gases. From the top of the range a discharge conduit section 18 is provided of substantially the same diameter as the conduit 16.

Between the conduit section 18 and the duct 16 a grease extracting unit 15 is arranged in which the gases are first passed through a movable series of grease extracting blades, at the same time that the direction of the flow of gas is changed, so that these blades tend to gather entrained droplets of grease, particularly the grease particles of larger size. In the second phase of the grease extracting operation, the grease laden gases are carried through an annular filter mounted for rotation with the grease extracting blades.

In the conduit section 18 a cross channel 19 is provided carrying at a central point thereof an upright stationary shaft 20 which is secured at the reduced upper end in a similar cross channel 21 placed in a conduit section or baffle 22 located inside a casing 23. Shaft 20 has journaled thereon by means of a suitable bushing 24 a baffle or interceptor plate 26, which is spaced from the outer wall of the casing 23, which forms a conduit portion of enlarged cross-section between the conduit sections 18 and 16. From the lower surface of the plate 26 there depend a series of V-shaped grease extracting blades 27, which are disposed in angled relation about their axis of rotation. The blades 27 act also as drive blades for the interceptor plate or wheel 26 under the influence of gases driven by the blower 17. These blades in action tend to be self cleaning and expel centrifugally any droplets of grease collected thereon.

The tubular or cylindrical filter unit carried by plate 26 comprises a tubular shaped filter 31 of grease entraining and retaining material, carried on an inner frame surface 32 of expanded metal, and held in place by a suitable screen 33 disposed about its outer surface. The size of the fibers of the filter medium is selected with reference to the desired particle size or droplets of grease to be collected, and serves not only to entrain additional grease droplets, but also catches any of the droplets from the blades 27, which become reentrained in the flow upwardly through the filter. The annular filter 31 also overlaps conduit section 22, to form a seal against the direct flow of gases, the closeness of the spacing minimizing any escape of grease droplets therethrough and back to the air stream. Drops of grease remaining in the gases flowing radially inwardly through the filter 31 will be in part repelled by the filter and will descend in the casing 23 for removal through the pipe 36, and in part will enter and be retained in the filter.

The lower portion of the casing 23 forms a grease trap from which a drain pipe 36 extends.

While I have shown and described a preferred apparatus and method for carrying out the invention, it will be understood that the invention is capable of variation and modification from the form shown and described so that the scope thereof should be limited only by the scope of the claims appended hereto.

I claim:

1. In a ventilator construction for the cooking surface of a kitchen range, conduit means providing a path of flow of exhaust gases from said cooking surfaces, means for causing a flow of said gases through said path, rotatable means mounted in an upstream portion of said path with respect to said flow causing means to collect greases therefrom and to effect a change in the direction of flow of said gases from an axial flow to a generally radially outward flow of said gases, said rotatable means including an imperforate interceptor plate extending across said path with its periphery spaced inwardly from the inside of said conduit means so as to deflect gases flowing through said conduit means radially outwardly, said gases then return-flowing radially inwardly generally at 180° to their radial outward flow, and a tubular filter of grease entraining and retaining material carried by said rotatable means on said interceptor plate and disposed with its outer surface spaced inwardly from the inside of said conduit means whereby gases which have flowed past said interceptor plate along said path and radially outwardly and have return-flowed radially inwardly generally at 180° to their radial outward flow will pass through said filter from the outside to the inside thereof, drops of grease carried by said return-flow gas being in part repelled outwardly by the rotating filter and in part entering and being retained in said filter.

2. In a ventilator construction for the cooking surface of a kitchen range, conduit means providing a path of flow of exhaust gases from the cooking surface, means for causing a flow of gases through said path, means providing an enlarged portion of said path including a housing in a location upstream from said flow causing means, an entrance opening leading to said housing and defined by a first annular member, a rotary blade member having an imperforate top extending over said opening in spaced relation thereto and having a plurality of blades extending toward said opening and also directed generally radially outwardly toward the walls of said housing whereby exhaust gases passing through said entrance opening are deflected radially outwardly by said blade member and then flow radially inwardly, an exit opening from said housing defined by a second annular member; and a hollow rotary filter of grease entraining and retaining material mounted on said blade member and projecting therefrom and overlapping said second annular member, whereby the exhaust gases passing through said entrance opening and deflected outwardly by said blade member toward the walls of said housing and then reversing their direction through approximately 180° will pass radially inwardly through said hollow filter from the outside to inside thereof to reach said exit opening, drops of grease carried by exhaust gas flowing radially inwardly being in part repelled radially outwardly by said filter and in part entering and being retained by said filter.

References Cited in the file of this patent

UNITED STATES PATENTS

| | | |
|---|---|---|
| 1,302,716 | Sargent | May 6, 1919 |
| 2,341,245 | Sonntag | Feb. 8, 1944 |
| 2,392,038 | Gaylord | Jan. 1, 1946 |
| 2,532,420 | Pledger | Dec. 5, 1950 |
| 2,792,909 | Court | May 21, 1957 |
| 2,793,712 | Graswich et al. | May 28, 1957 |

FOREIGN PATENTS

| | | |
|---|---|---|
| 82,993 | Germany | Jan. 1, 1895 |